United States Patent
Kim et al.

(10) Patent No.: US 9,924,433 B2
(45) Date of Patent: Mar. 20, 2018

(54) HUB APPARATUS OF HETEROGENEOUS NETWORK AND METHOD OF OFFLOADING THE SAME

(71) Applicant: KT CORPORATION, Gyeonggi-do (KR)

(72) Inventors: Hyung-Jung Kim, Seoul (KR); Jong-Sik Lee, Seoul (KR); Sung-Yeop Pyun, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 206 days.

(21) Appl. No.: 14/652,509

(22) PCT Filed: Jul. 26, 2013

(86) PCT No.: PCT/KR2013/006720
§ 371 (c)(1),
(2) Date: Jun. 16, 2015

(87) PCT Pub. No.: WO2014/098339
PCT Pub. Date: Jun. 26, 2014

(65) Prior Publication Data
US 2015/0341839 A1    Nov. 26, 2015

(30) Foreign Application Priority Data
Dec. 21, 2012  (KR) .......................... 10-2012-0151332

(51) Int. Cl.
*H04W 4/00* (2009.01)
*H04W 36/22* (2009.01)
(Continued)

(52) U.S. Cl.
CPC ............ *H04W 36/22* (2013.01); *H04W 16/08* (2013.01); *H04W 16/32* (2013.01); *H04W 84/045* (2013.01)

(58) Field of Classification Search
CPC ... H04W 36/22; H04W 84/045; H04W 16/32; H04W 16/08; Y02B 60/50
See application file for complete search history.

(56) References Cited

U.S. PATENT DOCUMENTS

2009/0310568 A1  12/2009  Chen et al.
2009/0312024 A1  12/2009  Chen et al.
(Continued)

FOREIGN PATENT DOCUMENTS

EP    2373107 A1    10/2011
JP    2010-147848 A   7/2010
(Continued)

*Primary Examiner* — Ayaz Sheikh
*Assistant Examiner* — Hai-Chang Hsiung
(74) *Attorney, Agent, or Firm* — IP Legal Services, LLC

(57) ABSTRACT

A hub apparatus may be provided for distributing a load of a small cell digital unit to a macro cell digital unit in a heterogeneous network. The hub apparatus includes an offloading controller configured to determine a first small cell, as an offloading target among a plurality of small cells based on a load of the macro cell digital unit and the small cell digital unit, to determine a first digital unit processing a load of the first small cell among at least one macro cell digital unit, to that generate a first control signal that requests connection to the first digital unit and a low-power radio unit of the first small cell, a path change unit connected to each of an antenna, having one side installed in the macro cell and a low-power radio unit installed in each small cell, having the other side connected to each of the macro cell digital unit and the small cell digital unit, configured to form a path connecting the one side and the other side, and configured to change a digital unit connected to a corresponding low-power radio unit based on the first control signal.

10 Claims, 11 Drawing Sheets

(51) Int. Cl.
  *H04W 84/04* (2009.01)
  *H04W 16/08* (2009.01)
  *H04W 16/32* (2009.01)

(56) References Cited

U.S. PATENT DOCUMENTS

| | | |
|---|---|---|
| 2010/0296487 A1 | 11/2010 | Karaoguz et al. |
| 2011/0096736 A1 | 4/2011 | Kwon et al. |
| 2011/0256880 A1 | 10/2011 | Golaup et al. |
| 2012/0270553 A1 | 10/2012 | Ha |
| 2013/0217402 A1* | 8/2013 | Lin ............... H04W 72/12 455/450 |
| 2013/0217407 A1 | 8/2013 | Gerlach et al. |
| 2015/0031369 A1* | 1/2015 | Gunnarsson ......... H04W 36/04 455/438 |
| 2015/0245270 A1* | 8/2015 | Wu ............... H04W 36/22 370/331 |

FOREIGN PATENT DOCUMENTS

| | | |
|---|---|---|
| KR | 10-2011-0045936 A | 5/2011 |
| KR | 10-2011-0140052 A | 12/2011 |
| KR | 10-2012-0119826 A | 10/2012 |
| KR | 10-2013-0008157 A | 1/2013 |
| WO | 2012/059310 A1 | 5/2012 |

\* cited by examiner

HUB APPARATUS OF HETEROGENEOUS NETWORK AND METHOD OF OFFLOADING THE SAME

CROSS REFERENCE TO RELATED APPLICATIONS

This application is a National Stage Patent Application of PCT International Patent Application No. PCT/KR2013/006720 (filed on Jul. 26, 2013) under 35 U.S.C. § 371, which claims priority to Korean patent Application No. 10-2012-0151332 (filed on Dec. 21, 2012), the teachings of which are incorporated herein in their entireties by reference.

TECHNICAL FIELD

The present disclosure relates to a hub apparatus of a heterogeneous network and a method of offloading the same.

BACKGROUND ART

In an in-building environment, a network is constructed with a femto cell or a repeater using a radio frequency cable. Recently, for the in-building network, a neutral hosting method has been in the spotlight. The neutral hosting method constructs a common network and provides a service to a plurality of communication providers through the common network.

An in-building network may be constructed as a heterogeneous network (Het-Net) that includes a small cell in addition to a macro cell. That is, an in-building network includes a macrocell for servicing a wide region and small cells intensively deployed at a hot spot. Such a macro cell and a small cell may be independently connected to separate digital signal processing apparatuses. In this case, each digital signal processing apparatus processes traffic of only one of the macro cell and the small cell connected thereto. Therefore, it is difficult for the digital signal processing apparatus to perform offloading between the macro cell and the small cell. Therefore, a network operator should design each one of a macro cell and a small cell based on maximum traffic. Due to such requirement, high investment cost is required.

When a small cell is formed with equipment of a third party, such a small cell may not have an interface connected to the macro cell. Therefore, even if traffic explosively increases in the small cell, it is difficult for an adjacent macro cell digital signal processing apparatus to distribute a load of the small cell in which traffic explosively increases.

Particularly, there is a demand for a technology of adaptively distributing traffic load between a macro cell and a small cell according to traffic variation dynamically changing with time in a particular region where requires a plurality of small cells, for example, a shopping mall or a stadium.

DISCLOSURE

Technical Problem

The present disclosure has been made in an effort to provide a hub apparatus having advantages of being capable of selectively changing a digital signal processing apparatus that processes traffic of a designated cell according to traffic change in a macro cell and a small cell or being capable of offloading traffic load in one of the macro cell and the small cell by changing coverage of the macro cell and the small cell.

Technical Solution

An exemplary embodiment of the present disclosure provides a hub apparatus for distributing a load of a small cell digital unit to a macro cell digital unit in a heterogeneous network including at least one macro cell and a plurality of small cells overlapped with the at least one macro cell, wherein the macro cell digital unit performs digital signal processing of each macro cell, the small cell digital unit performs digital signal processing of the plurality of small cells, and the macro cell is separated from the small cell. The hub apparatus may include an offloading controller and a path change unit. The offloading controller may be configured to determine a first small cell, as an offloading target among the plurality of small cells based on a load of the macro cell digital unit and the small cell digital unit, configured to determine a first digital unit processing a load of the first small cell among at least one macro cell digital unit, and configured to generate a first control signal that requests connection to the first digital unit and a low-power radio unit of the first small cell. The path change unit may be configured to be connected to each of an antenna, configured to have one side installed in the macro cell and a low-power radio unit that installed in each small cell, configured to have the other side connected to each of the macro cell digital unit and the small cell digital unit, configured to form a path connecting the one side and the other side, configured to change a digital unit in which a corresponding low-power radio unit is connected based on the first control signal.

The offloading controller may control the first digital unit to reduce coverage of a macro cell that performs digital signal processing, when the first digital unit does not have available resources for processing a load of the first small cell.

The offloading controller may further include an antenna output change unit configured to generate a second control signal that requests to lower output of an antenna that is related to the first digital unit and that is connected to an antenna that is installed in the macro cell and configured to adjust output power of a corresponding antenna based on the second control signal.

The hub apparatus may further include a load detection unit configured to detect a load of the macro cell digital unit and the small cell digital unit based on uplink interference information of each of the plurality of small cells and the macro cell.

The other side of the path change unit may be connected to each of a macro radio unit and a small cell radio unit, the macro radio unit may be connected to the macro cell digital unit, and the small cell radio unit may be connected to the small cell digital unit.

Another embodiment of the present disclosure provides a method for, by a hub apparatus, distributing a load of a small cell digital unit to a macro cell digital unit in a heterogeneous network including at least one macro cell and a plurality of small cells overlapped with the at least one macro cell, wherein the macro cell digital unit performs a digital signal processing of each macro cell, the small cell digital unit performs a digital signal processing of the plurality of small cells, the macro cell digital unit is separated from the small cell digital unit. The method may include: detecting a load of the macro cell digital unit and the small cell digital unit based on traffic that is received from an antenna that is installed in the macro cell and a low-power radio unit that is installed in each small cell; determining a first small cell, as an offloading target among the plurality of small cells based on a load of the macro cell digital unit and the small cell digital unit and determining a first digital unit that processes a load of the first small cell among at least one macro cell digital unit; and transferring traffic that is received from a low-power radio unit that is installed in the first small cell to the first digital unit.

The determining of a first digital unit may include reducing coverage of a macro cell that is connected to the first digital unit, when the first digital unit does not have available resource for processing a load of the first small cell.

The determining of a first digital unit may include reducing, by the first digital unit, coverage of a macro cell that performs digital signal processing by lowering output of an antenna that is related to the first digital unit.

The transferring of traffic may include changing a traffic path of the first small cell from the small cell digital unit to the first digital unit.

Yet another embodiment of the present disclosure provides a method for distributing, by a hub apparatus, a load of a small cell digital unit to a macro cell digital unit in a heterogeneous network including at least one macro cell and a plurality of small cells overlapped with the at least one macro cell, wherein a macro cell digital unit performs digital signal processing of each macro cell and a small cell digital unit performs digital signal processing of the plurality of small cells are separated, including: detecting available resources of the macro cell digital unit and the small cell digital unit based on uplink interference information that is received from an antenna that is installed in the macro cell and a low-power radio unit that is installed in each small cell; determining a first small cell, as an offloading target among the plurality of small cells, when the available resources of the small cell digital unit are lower than a threshold value; determining a digital unit to process a load of the first small cell among at least one macro cell digital unit based on available resources of the macro cell digital unit; reducing coverage of a macro cell that is connected to a first digital unit among at least one macro cell digital unit, when a digital unit having no available resource; and transferring traffic received from a low-power radio unit installed in the first small cell to the first digital unit.

The transferring of traffic that is received from a low-power radio unit may include changing a digital unit that performs digital signal processing of the first small cell from the small cell digital unit to the first digital unit.

The reducing of coverage of a macro cell may include reducing, by the first digital unit, coverage of a macro cell that performs digital signal processing by lowering output of an antenna that is related to the first digital unit.

The determining of a digital unit to process a load of the first small cell may include transferring traffic that is received from a low-power radio unit that is installed in the first small cell to the second digital unit, when a second digital unit has available resources.

Advantageous Effects

According to an exemplary embodiment of the present disclosure, a hub apparatus can distribute a load by changing a path of a macro cell and a small cell connected to a digital signal processing apparatus according to a traffic change of each network without a change of a network. According to an exemplary embodiment of the present disclosure, because a macro cell and a small cell can share and use a resource of a digital signal processing apparatus, resource efficiency of an entire network can be enhanced. Therefore, according to an exemplary embodiment of the present disclosure, load can be efficiently distributed in a region having frequent and abrupt traffic changes, such as a plaza or a stadium. Accordingly, it is not necessary to increase network resource capacity in order to support such temporarily increasing events. Further, according to at least one embodiment of the present disclosure, even if a small cell is formed with third party equipment having no interface with a macro cell, a hub apparatus changes a signal path of a small cell to a digital signal processing apparatus of a macro cell to interlock the macro cell and the small cell.

MODE FOR INVENTION

Figure 1:
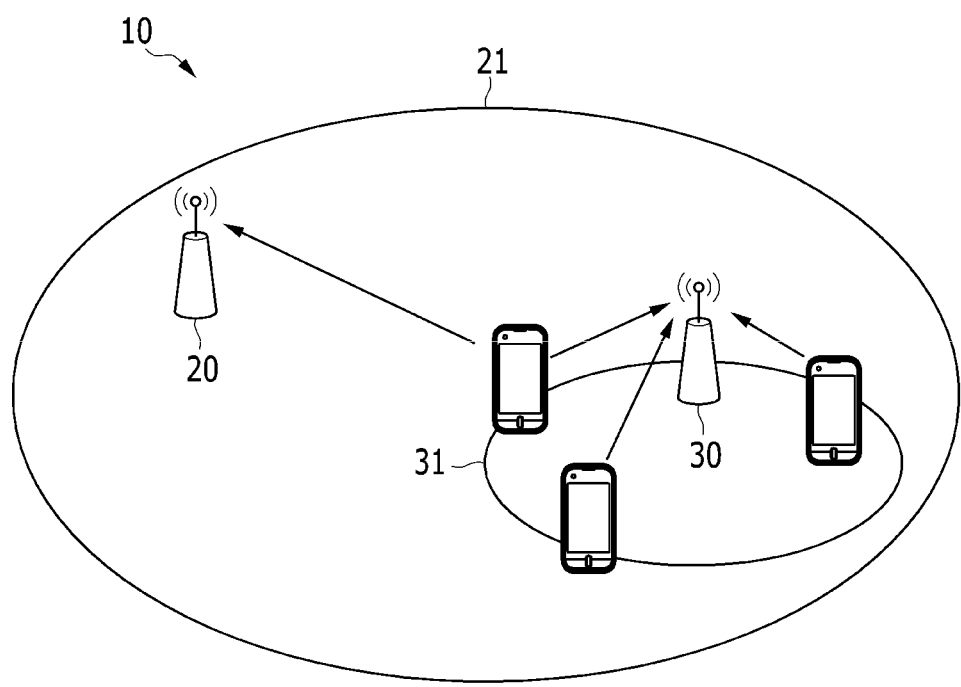
FIG. 1 is a diagram illustrating a heterogeneous network according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, in an entire specification, unless explicitly described to the contrary, the word "comprise" and variations such as "comprises" or "comprising" will be understood to imply the inclusion of stated elements but not the exclusion of any other elements.

Hereinafter, a hub apparatus of a heterogeneous network and a method of offloading the same will be described.

FIG. 1 is a diagram illustrating a heterogeneous network according to an exemplary embodiment of the present disclosure.

Referring to FIG. 1, a heterogeneous network (Het-Net) 10 includes networks each having different cell coverage and overlapping the other. For example, the heterogeneous network 10 includes a macro cell 21 and a small cell 31. The macro cell 21 is a service region of a base station 20, the small cell 31 is a service region of a base station 30, and are overlapped each other. The small cell 31 has smaller coverage than that of the macro cell 21. A plurality of small cells 31 may exist in one macro cell 21. A plurality of macro cells 21 may be overlapped or adjacent.

Figure 2:
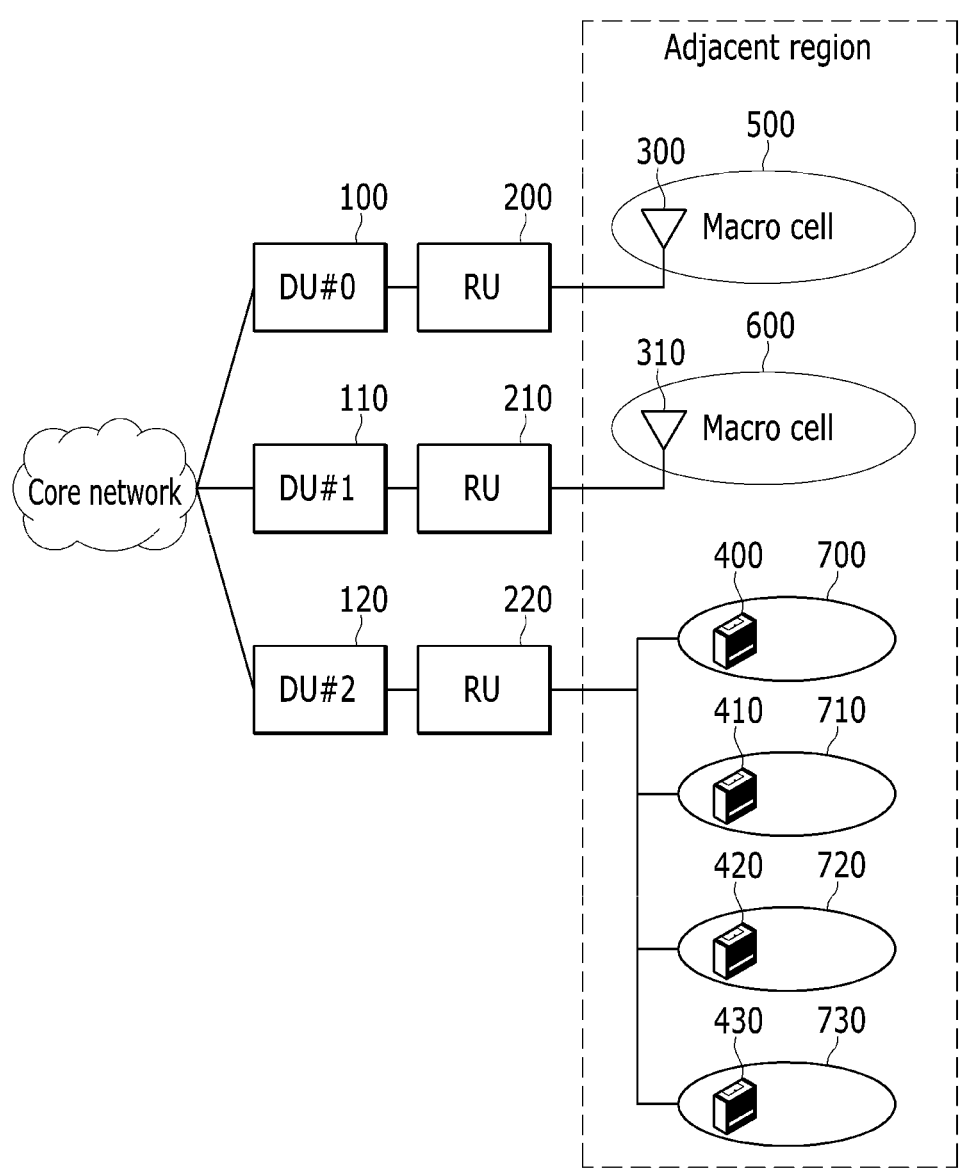
FIG. 2 is a diagram illustrating an exemplified configuration of a heterogeneous network.
Figure 3:
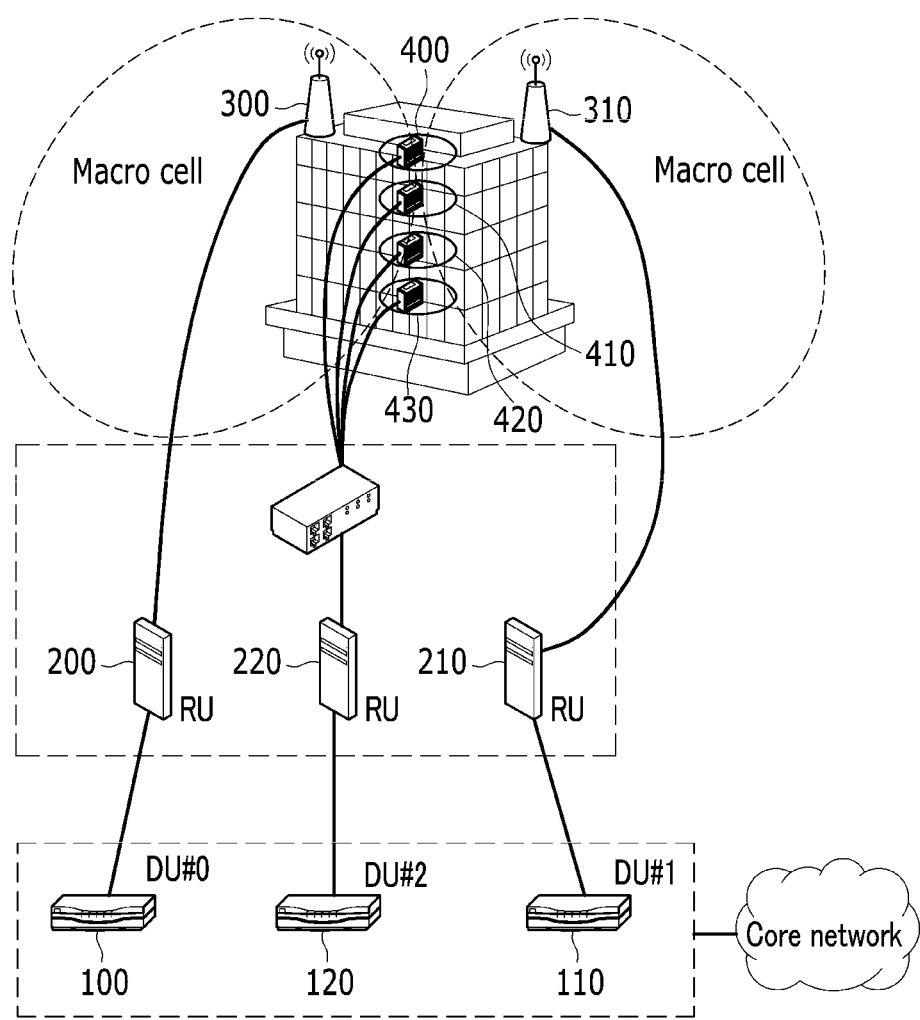
FIG. 3 is a diagram illustrating an exemplified configuration of a heterogeneous network that is constructed in an in-building.
Figure 4:
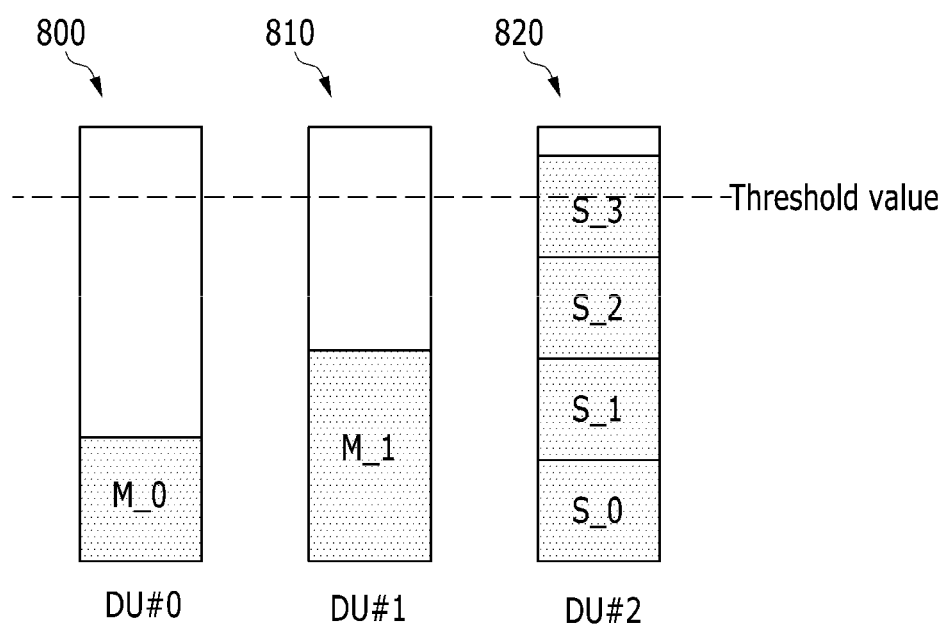
FIG. 4 is a diagram illustrating a load of a heterogeneous network.

FIG. 2 is a diagram illustrating an exemplified configuration of a heterogeneous network, FIG. 3 is a diagram illustrating an exemplified configuration of a heterogeneous network that is constructed in a building, and FIG. 4 is a diagram illustrating a load of a heterogeneous network.

Referring to FIG. 2, a base station may be divided into a digital signal processing apparatus and a radio signal processing apparatus. Hereinafter, a digital signal processing apparatus is simply described as a digital unit (DU) and is referred to as a "DU". A radio signal processing apparatus is simply described as a radio unit (RU) and, hereinafter, is a referred to as an "RU". A plurality of RUs may be connected to one DU, but it is assumed that one DU is connected to one RU.

DUs 100, 110, and 120 are connected to RUs 200, 210, and 220, respectively, to perform various digital signal processing and resource management control that are related to a terminal. Different physical cell IDs are allocated to the DUs 100, 110, and 120, respectively. The DUs 100-120 are connected to a core network. The core network may include a Mobility Management Entity (MME), a Serving GateWay (S-GW), and a Packet GateWay (P-GW).

The RUs 200, 210, and 220 are respectively installed in predetermined cells. The RU is a device that amplifies a propagation signal of a radio signal processing part of a base station and transmits the amplified propagation signal to an antenna. That is, the RU transmits a radio signal to and receives a radio signal from a terminal.

It is assumed that the RU 200 is connected to an antenna 300 to provide a service to a macro cell 500 and that the RU 210 is connected to an antenna 310 to provide a service to a macro cell 600.

The RU 220 is connected to low-power RUs 400, 410, 420, and 430. It is assumed that the low-power RUs 400-430 provide a service to small cells 700, 710, 720, and 730, respectively. The low-power RUs 400-430 may be connected to the RU 220 through a hub (not shown). The small cells 700-730 are each overlapped with at least one of the macro cells 500 and 600.

Referring to FIG. 3, an in-building network may be formed with the DUs 100-120, the RUs 200-220, the antennas 300 and 310, and the low-power RUs 400-430. For example, the leach one of low-power RUs 400-430 may be installed in a floor, and coverage of the low-power RUs 400-430 may be overlapped with at least one of the macro cells 500 and 600.

Referring to FIG. 4, each one of the DUs 100-120 processes traffic of a corresponding one of the cells 500, 600, and 700-730 using own radio sector resource capacity 800, 810, or 820. Here, the resource capacities 800, 810, and 820 denote radio resource amounts assigned to a DU. A radio resource may be expressed with an amount of a radio block or a radio bearer. A load of currently using macro cell 500 is M_0, a load of the macro cell 600 is M_1, and loads of each of the small cells 700-730 are expressed as S_0, S_1, S_2, and S_3.

When traffic is explosively generated in the small cells 700-730, the resource capacity 820 of the DU 120 may be fully occupied. However, the small cells 700-730 and adjacent DUs 100 and 110 do not have an interface. Therefore, even if resource capacities 800 and 810 of the adjacent DU have available resources, it is difficult for the adjacent DUs 100 and 110 to use own resources for distributing traffic of the small cells 700-730.

In order to solve such a traffic problem, an operator may forcibly reduce coverage by lowering pilot power of the DU 120 connected to the small cells 700-730. An operator may forcibly extend coverage of the small cells 700-730 to a macro cell by raising pilot power of the DUs 100 and 110 of a macro cell that is partially overlapped with the small cells 700-730. However, because a location of the low-power RUs 400-430 is stationary, an effect is not large to distribute traffic from the small cells 700-730 to the macro cells 500 and 600.

Figure 5:
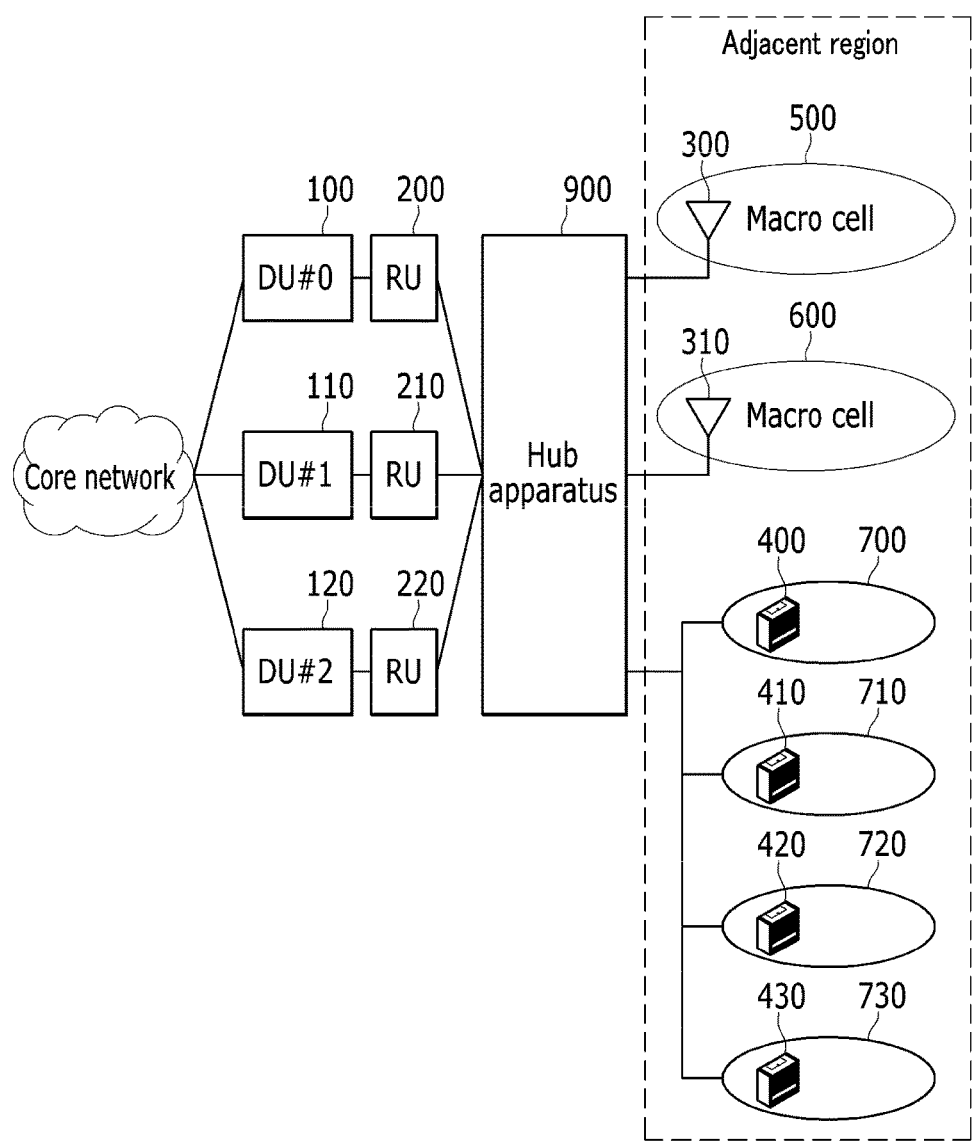
FIG. 5 is a diagram illustrating an exemplified configuration of a heterogeneous network including a hub apparatus according to an exemplary embodiment of the present disclosure.
Figure 6:
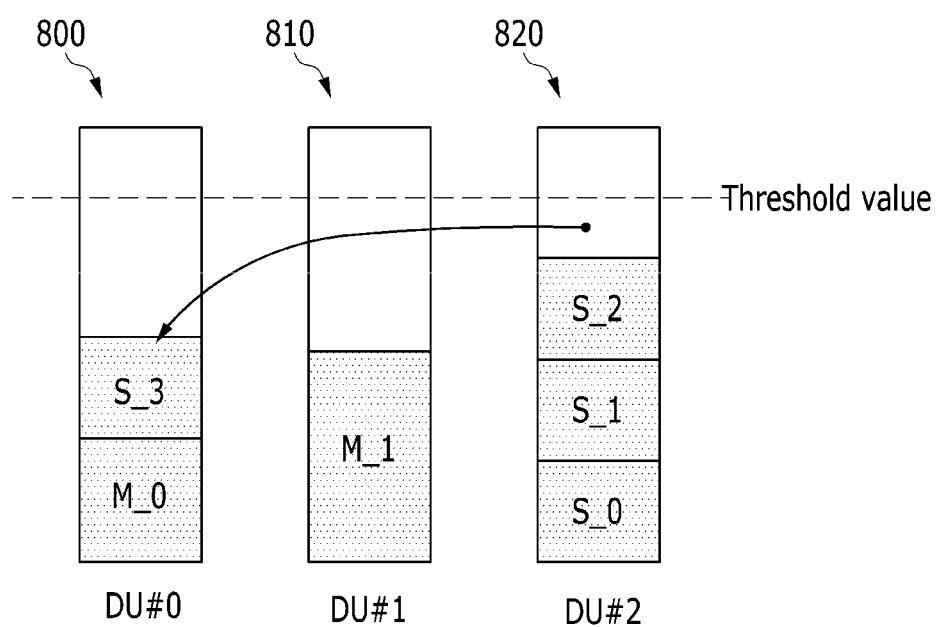
FIG. 6 is a diagram illustrating offloading according to an exemplary embodiment of the present disclosure.

FIG. 5 is a diagram illustrating an exemplified configuration of a heterogeneous network including a hub apparatus according to an exemplary embodiment of the present disclosure, and FIG. 6 is a diagram illustrating offloading according to an exemplary embodiment of the present disclosure.

Referring to FIG. 5, one side of a hub apparatus 900 is connected to RUs 200-220, and the other side thereof is connected to the antennas 300 and 310 and the low-power RUs 400-430. The hub apparatus 900 is connected to each of the antennas 300 and 310 and the low-power RUs 400-430.

The hub apparatus 900 receives a signal from the antennas 300 and 310 and the low-power RUs 400-430 and transmit the received signal to any one of the RUs 200-220. That is, the hub apparatus 900 receives an radio frequency (RF) signal from the antennas 300 and 310 and the small output RUs 400-430 and transmits the received RF signal to any one DU.

The hub apparatus 900 maps an antenna unit and the RUs 200-220, as in Table 1, so that the DU 100-the RU 200-the antenna 300 are connected, the DU 110-the RU 210-the antenna 310 are connected, and the DU 120-the RU 220-the low-power RUs 400-430 are connected in a normal state. Here, the antenna unit includes a macro cell antenna and a low-power RU.

TABLE 1

| Normal state | |
|---|---|
| Antenna unit | RU |
| Antenna 300 | RU 200 |
| Antenna 310 | RU 210 |
| Low-power RU 400 | RU 220 |
| Low-power RU 410 | |
| Low-power RU 420 | |
| Low-power RU 430 | |

The hub apparatus 900 monitors uplink interference information that is received from the antennas 300 and 310 and respective low-power RUs 400-430.

The hub apparatus 900 determines a load of each DU based on a monitoring result. Because the hub apparatus 900 is not directly connected to the DU, the hub apparatus 900 may not directly know a resource/load of the DU. Therefore, the hub apparatus 900 estimates a load level of each DU based on information that it can acquire itself, i.e., uplink interference information on each radio path basis. A cell having many users uses many radio resources, and a cell using many DU resources increases an uplink interference signal in proportion to traffic. Therefore, the hub apparatus 900 can determine a resource amount/load of the DU based on uplink interference information.

For example, as shown in FIG. 4, the hub apparatus 900 may determine that a load of the DU 120 is high and that a load of the DU 100 and 110 is low.

Hereinafter, the hub apparatus 900 changes a path of an RU and an antenna unit so that another DU processes traffic of a cell that is connected to the DU 120 having a high load. That is, in order to transmit traffic of the low-power RU 430 to the DU 100 that processes traffic of the macro cell 500, the hub apparatus 900 connects the antenna unit and the RU 200, as in Table 2.

Therefore, the small cell 730 is connected to the DU 100, and the small cell 730 is changed to a cell having a cell identifier of the DU 100.

TABLE 2

| Offloading state | |
|---|---|
| Antenna unit | RU |
| Antenna 300 | RU 200 |
| Antenna 310 | RU 210 |
| Low-power RU 400 | RU 220 |
| Low-power RU 410 | |
| Low-power RU 420 | |
| Low-power RU 430 | RU 200 |

Referring to FIG. 6, because traffic of the low-power RU 430 does not flow thereto, a load of the DU 120 is lowered. The DU 100 having sufficient resources receives traffic of the low-power RU 430.

That is, even if a load S_3 of the small cell 730 is transferred to the DU 100, a resource capacity 800 of the DU 100 has available resources. As the load S_3 of the small cell 730 reduces, some resources of a resource capacity 820 of the DU 120 become available.

In this way, the hub apparatus 900 can effectively distribute a load of a small cell and a macro cell without modifying an existing apparatus.

Figure 7:
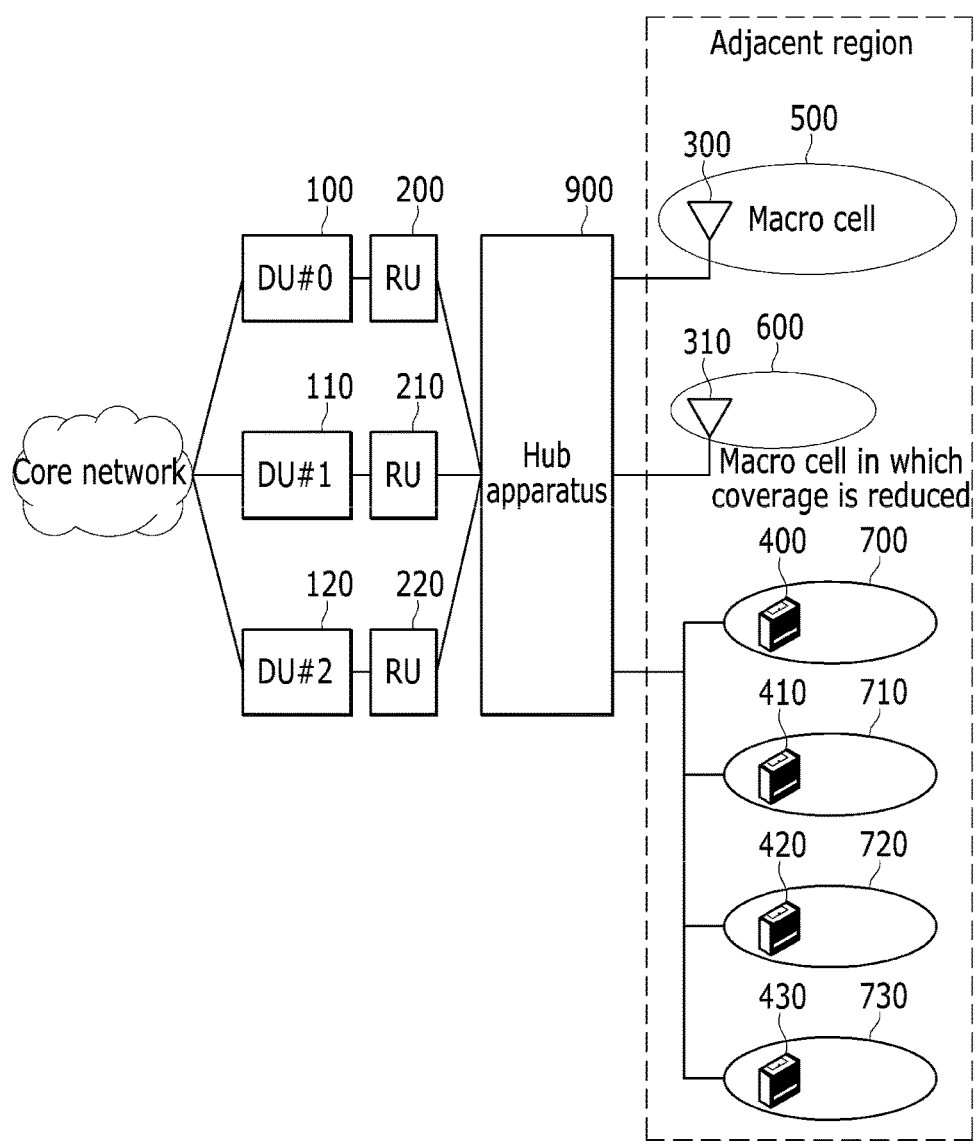
FIG. 7 is a diagram illustrating an exemplified configuration of a heterogeneous network including a hub apparatus according to another exemplary embodiment of the present disclosure.
Figure 8:
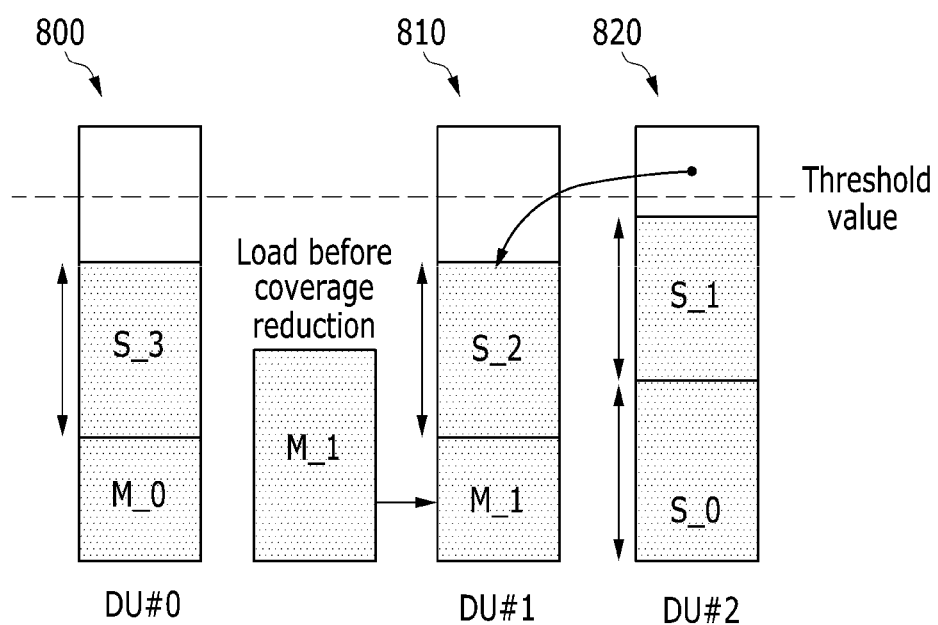
FIG. 8 is a diagram illustrating offloading according to another exemplary embodiment of the present disclosure.

FIG. 7 is a diagram illustrating an exemplified configuration of a heterogeneous network including a hub apparatus according to another exemplary embodiment of the present disclosure, and FIG. 8 is a diagram illustrating offloading according to another exemplary embodiment of the present disclosure.

Referring to FIG. 7 and FIG. 8, a hub apparatus 900 controls power of antennas 300 and 310 to adjust coverage of macro cells 500 and 600. Due to reduced coverage, traffic that flows into a DU 100/110 is reduced. Therefore, the hub apparatus 900 can increase resource capacity for distributing traffic of a small cell to the DU 100/110. In this case, the macro cell 500/600 is overlapped with an adjacent macro cell. Therefore, when coverage of the macro cell is reduced, a terminal that is located at an outer edge of the macro cell may be handed over to an adjacent macro cell.

As shown in FIG. 6, the DU 120 may be in an overload state after offloading traffic of a small cell 730 to the macro cell DU 100 because traffic of small cells 700-720 increases. However, it may be difficult for the macro cell DUs 100 and 110 to accept traffic of any small cells, for example, the small cell 720, when load states of the DUs 100 and 110 are higher than a predetermined level. In this case, the hub apparatus 900 lowers an output power of the antenna 310 and reduces coverage of the macro cell 600. Accordingly, due to reduced coverage, traffic that flows into the DU 110 is reduced. That is, by adjusting coverage of the macro cell 600, the hub apparatus 900 secures a margin for accepting traffic of the small cell 720 in the DU 110. By reducing coverage of the macro cell 600, the hub apparatus 900 may control the DU 110 to preferentially process traffic of the small cell 720.

That is, when a load S_3 of the small cell 730, which was moved to the DU 100, increases, the DU 100 cannot receive a load S_2 of another small cell, for example, the small cell 720. The DU 110 cannot receive a load S_2 of the small cell 720 due to a load M_1 of the macro cell 600. Therefore, by reducing coverage of the macro cell 600, the hub apparatus 900 reduces a load M_1 of the macro cell 600. As the load M_1 reduces, some resources of a resource capacity 810 becomes available. Therefore, the hub apparatus 900 distributes the load S_2 of the small cell 720 to the DU 110.

Figure 9:
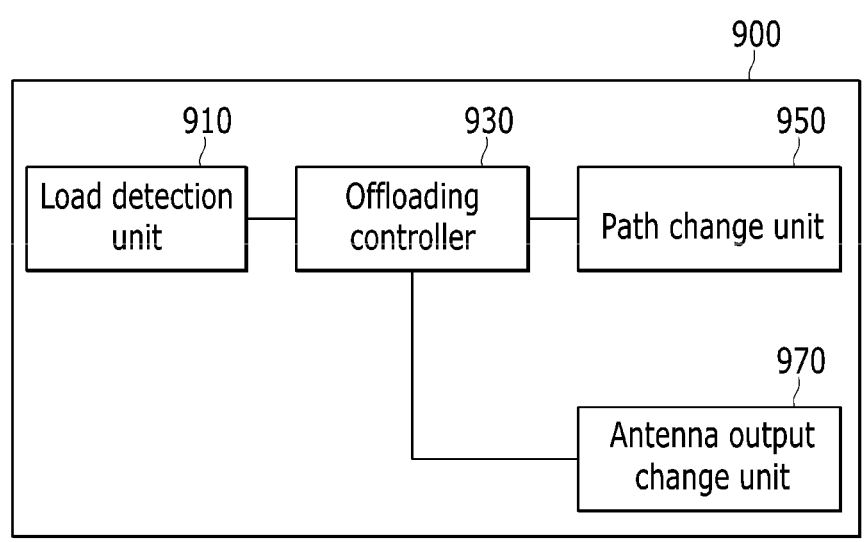
FIG. 9 is a block diagram illustrating a hub apparatus according to an exemplary embodiment of the present disclosure.

FIG. 9 is a block diagram illustrating a hub apparatus according to an exemplary embodiment of the present disclosure.

Referring to FIG. 9, the hub apparatus 900 includes a load detection unit 910, an offloading controller 930, a path change unit 950, and an antenna output change unit 970.

The load detection unit 910 monitors a traffic amount of each one of a plurality of cells 500, 600, and 700-730. The load detection unit 910 monitors uplink interference information based on a signal received from the antennas 300 and 310 that are installed in a macro cell and the respective low-power RUs 400-430. The load detection unit 910 estimates a radio sector resource capacity, i.e., a load of a DU of each cell, based on uplink interference information.

The offloading controller 930 determines whether it is necessary to perform offloading between cells based on a radio sector resource capacity of a DU of each cell. When a DU resource of any cell is insufficient, the offloading controller 930 determines an offloading target cell and selects an offloading processing DU that processes a load of the offloading target cell based on a resource capacity/load of a DU of each cell. For example, the offloading controller 930 determines the small cell 730 as an offloading target cell and selects, as the offloading processing DU, the DU 100 to process a load of the small cell 730. The offloading controller 930 transfers a path change request signal including an offloading target cell and offloading processing DU information to the path change unit 950.

The offloading controller 930 detects a macro cell DU necessary for adjusting coverage based on a radio sector resource capacity of a DU of each cell. When total load of DUs is high, there might be no DU available to accept traffic of another cell. The offloading controller 930 secures predetermined DU resources by reducing traffic that flows from a macro cell through reducing coverage of the macro cell DUs 100 and 110. The offloading controller 930 transfers an antenna output power change request signal including macro cell information that indicates a macro cell having coverage required to be controller.

The path change unit 950 changes a connection of a corresponding RU and antenna/low-power RU based on a path change request signal received from the offloading controller 930.

The antenna output change unit 970 adjusts an output power of an antenna of a macro cell having coverage required to be controlled based on an antenna output power change request signal received from the offloading controller 930.

Figure 10:
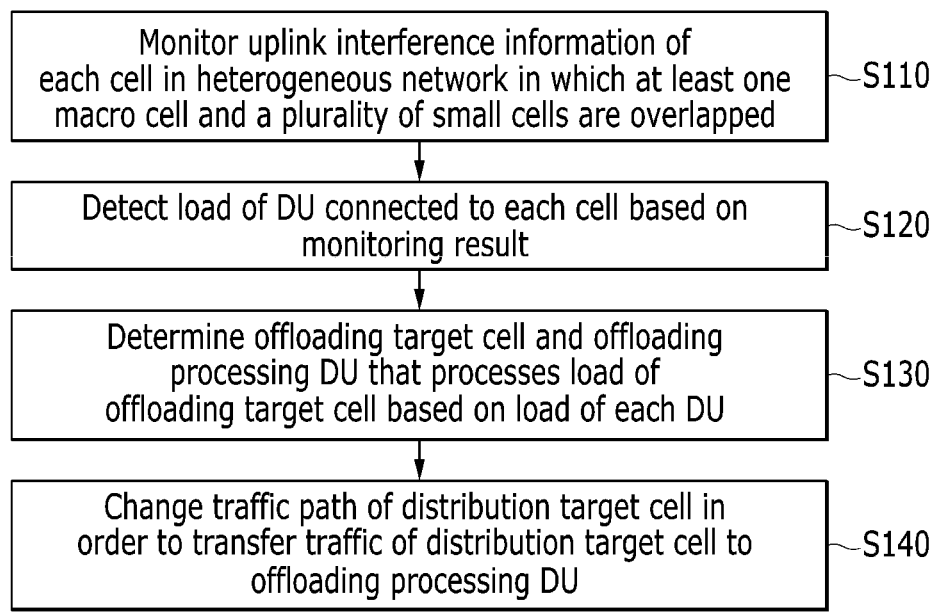
FIG. 10 is a flowchart illustrating a method of offloading a hub apparatus according to an exemplary embodiment of the present disclosure.

FIG. 10 is a flowchart illustrating a method of offloading a hub apparatus according to an exemplary embodiment of the present disclosure.

Referring to FIG. 10, in a heterogeneous network including at least one macro cell and a plurality of small cells overlapped with the macro cell, the hub apparatus 900 monitors a traffic amount of each cell (S110). The hub apparatus 900 monitors uplink interference information based on a signal received from antennas 300 and 310 that are installed in a macro cell and respective low-power RUs 400-430.

The hub apparatus 900 detects a load of a DU that is connected to each cell based on a monitoring result (S120).

The hub apparatus 900 determines an offloading target cell and selects an offloading processing DU that processes a load of the offloading target cell based on a load of each DU (S130).

In order to transfer traffic of a distribution target cell to the offloading processing DU, the hub apparatus 900 changes a traffic path of the distribution target cell (S140). The hub apparatus 900 is located between the RUs 200-220 and the antennas 300 and 310 and between the RUs 200-220 and the low-power RUs 400-430. Therefore, the hub apparatus 900 connects an antenna or a low-power RU, which is installed in the offloading target cell, to the selected RU connected to the offloading processing DU. Therefore, a load of the DU of the offloading target cell is lowered, and the selected DU, which has a low load state, processes traffic of the offloading target cell.

Figure 11:
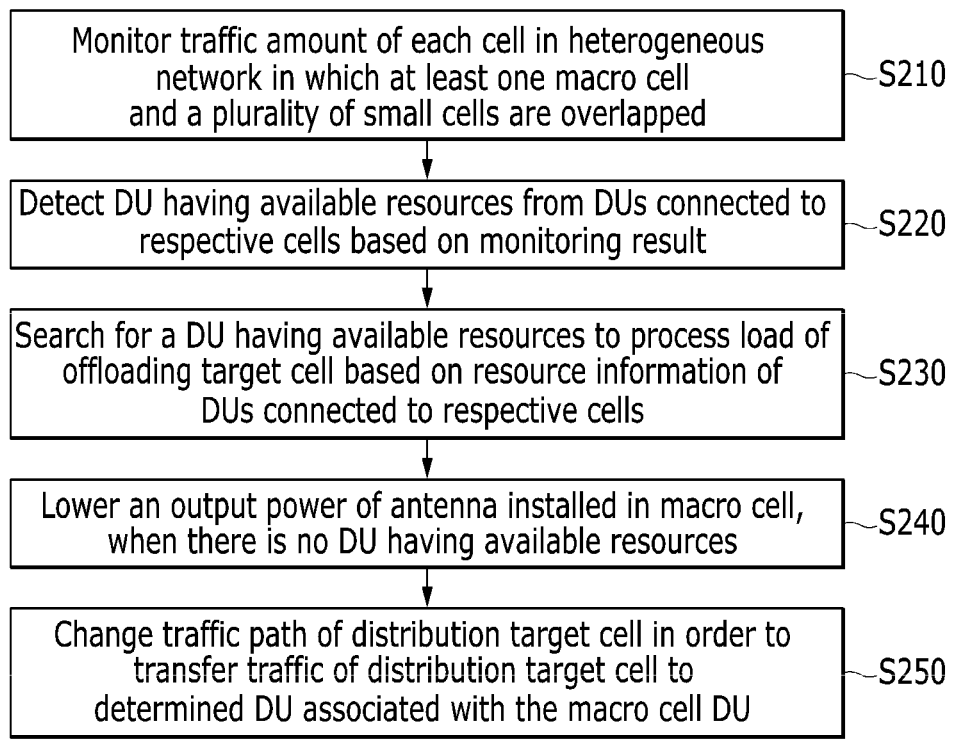
FIG. 11 is a flowchart illustrating a method of offloading a hub apparatus according to another exemplary embodiment of the present disclosure.

FIG. 11 is a flowchart illustrating a method of offloading a hub apparatus according to another exemplary embodiment of the present disclosure.

Referring to FIG. 11, in a heterogeneous network including at least one macro cell and a plurality of small cells overlapped with the at least one macro cell, the hub apparatus 900 monitors a traffic amount of each cell (S210). The hub apparatus 900 monitors uplink interference information based on a signal received from antennas 300 and 310 that are installed in a macro cell and respective low-power RUs 400-430.

The hub apparatus 900 detects a DU having available resources from DUS connected to respective cells based on a monitoring result (S220).

The hub apparatus 900 searches for a DU having available resources to process a load of an offloading target cell based on resource information of DUs connected to respective cells (S230). When a load of the DU 120 connected to small cells is greater than a threshold value, i.e., when available resources thereof are lower than a threshold value, the hub apparatus 900 distributes a load of the DU 120 to another DU.

When there is no DU having available resources, the hub apparatus 900 lowers an output power of an antenna installed in a macro cell (S240). A DU associated with the macro cell having reduced coverage is determined as a DU of an offloading target cell.

In order to transfer traffic of a distribution target cell to the determined DU associated with the macro cell DU having antenna output power lowered, the hub apparatus 900 changes a traffic path of the distribution target cell (S250).

As described, according to an exemplary embodiment of the present disclosure, a hub apparatus can distribute a load by changing a path between a macro cell and a digital signal processing apparatus and/or between a small cell and a digital signal processing apparatus according to traffic change in each network without modifying a network. According to an exemplary embodiment of the present disclosure, because a macro cell and a small cell can share and use a resource of a digital signal processing apparatus, resource efficiency of an entire network can be enhanced. Therefore, according to an exemplary embodiment of the present disclosure, load can be effectively distributed in a region having abrupt and frequent traffic changes, such as a plaza or a stadium.

Accordingly, it is not necessary to additionally increase network resource capacity in order to support events temporally increasing. Further, according to at least one embodiment of the present disclosure, even if a small cell is formed with third party equipment having no interface with a macro cell, the hub apparatus changes a signal path of the small cell to a digital signal processing apparatus of the macro cell to interact the macro cell and the small cell.

The foregoing exemplary embodiment of the present disclosure may not only be embodied through an apparatus and a method, but may also be embodied through a program that executes a function corresponding to a configuration of the exemplary embodiment of the present disclosure or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A hub apparatus for distributing a load of a small cell digital unit to one of macro cell digital units in a heterogeneous network having at least one of macro cells and a plurality of small cells overlapped with the at least one of macro cells, wherein each one of the macro cell digital units performs digital signal processing of a corresponding macro cell, the small cell digital unit performs digital signal processing of the plurality of small cells, and the macro cell digital units are separated from the small cell digital unit, the hub apparatus comprising:

a load detection unit configured to detect available resource of the macro cell digital units and the small cell digital unit based on uplink interference information of each of the plurality of small cells and the macro cells;

an offloading controller configured to determine a first small cell, as an offloading target, among the plurality of small cells based on the detected available resource of the macro cell digital units and the small cell digital unit, to select one of the macro cell digital units for processing a load of the first small cell, to generate a first control signal for requesting connecting the selected macro cell digital unit to a low-power radio unit of the first small cell; and a path change unit having a first side connected to antennas installed in the macro cells and low-power radio units each installed in a corresponding one of small cells and a second side connected to the macro cell digital units and the small cell digital unit, configured to form paths each connecting one of the antennas and the low-power radio units to one of the macro cell digital units and the small cell digital unit, and configured to change the paths to connect the selected macro cell digital unit to the low-power radio unit of the first small cell, wherein the offloading controller is configured to reduce coverage of a corresponding macro cell connected to the selected macrocell digital unit when the selected macro cell digital unit does not have available resources for processing a load of the first small cell.

2. The hub apparatus of claim 1, wherein the offloading controller further comprises:
an antenna output change unit connected to antennas each installed in macro cells, configured to generate a second control signal for requesting lowering output power of an antenna related to the selected macro cell digital unit, and configured to control output power of the antenna related to the selected macro cell digital unit based on the second control signal.

3. The hub apparatus of claim 1, wherein:
the second side of the path change unit is connected to macro radio units and a small cell radio unit;
the macro radio units are respectfully connected to the macro cell digital units; and
the small cell radio unit is connected to the small cell digital unit.

4. A method for, by a hub apparatus, distributing loads of a small cell digital unit to macro cell digital units in a heterogeneous network including macro cells and a plurality of small cells overlapped with the at least one of macro cells, wherein each of macro cell digital units performs digital signal processing of a corresponding macro cells, a small cell digital unit performs digital signal processing of the plurality of small cells, and the macro cell digital units are separated from the small cell digital unit, the method comprising:
detecting available resources of the macro cell digital units and the small cell digital unit based on information received from antennas respectively installed in the macro cells and a low-power radio unit installed in each small cell;
determining a first small cell, as an offloading target, among the plurality of small cells based on each load of the macro cell digital units and the small cell digital unit and selecting a first macrocell digital unit, from the macrocell digital units, in order for processing a load of the first small cell;
reducing coverage of a macro cell connected to the first macrocell digital unit when the first macrocell digital unit does not have available resource for processing a load of the first small cell; and
transferring traffic received from a low-power radio unit installed in the first small cell to the selected first macrocell digital unit by connecting the selected first macrocell digital unit to the low-power radio unit of the first small cell.

5. The method of claim 4, wherein the determining of a first macrocell digital unit comprises:
reducing, by the first macrocell digital unit, coverage of a macro cell that performs digital signal processing by lowering output power of an antenna that is related to the first macrocell digital unit.

6. The method of claim 4, wherein the transferring of traffic comprises:
changing a traffic path of the first small cell from the small cell digital unit to the first macrocell digital unit.

7. A method for, by a hub apparatus, distributing a load of a small cell digital unit to a macro cell digital unit in a heterogeneous network including macro cells and a plurality of small cells overlapped with the at least one of macro cells, wherein macro cell digital units each performs digital signal processing of a corresponding macro cell, the small cell digital unit performs digital signal processing of the plurality of small cells, each of the macro cell digital units is separated from the small cell digital unit, the method comprising:
detecting available resources of the macro cell digital units and the small cell digital unit based on uplink interference information received from each antenna installed in the macro cells and a low-power radio unit installed in each small cell;
determining a first small cell, as an offloading target, among the plurality of small cells, when the available resources of the small cell digital unit are lower than a threshold value;
selecting a macrocell digital unit from the macrocell digital units in order to process a load of the first small cell based on available resources of the macro cell digital units;
reducing coverage of a macro cell connected to the selected macrocell digital unit, when the selected macrocell digital unit has no available resource; and
transferring traffic received from a low-power radio unit installed in the first small cell to the selected macrocell digital unit by connecting the selected macrocell digital unit and the low-power radio unit of the first small cell.

8. The method of claim 7, wherein the transferring of traffic that is received from a low-power radio unit comprises:
changing a digital unit that performs digital signal processing of the first small cell from the small cell digital unit to the selected macrocell digital unit.

9. The method of claim 7, wherein the reducing of coverage of a macro cell comprises:
reducing, by the selected macrocell digital unit, coverage of a macro cell that performs digital signal processing by lowering output power of an antenna that is related to the selected macrocell digital unit.

10. The method of claim 7, wherein the selecting a macrocell digital unit comprises:
transferring traffic received from a low-power radio unit installed in the first small cell to a second macrocell digital unit, when the second macrocell digital unit has available resources.

* * * * *